Dec. 20, 1955     O. A. HAGEN     2,727,366

SPRINKLER SYSTEM ATTACHMENT FOR A LAWN UMBRELLA

Filed Dec. 31, 1952

INVENTOR.
Oscar A. Hagen

BY Victor J. Evans & Co.

ATTORNEYS

United States Patent Office 2,727,366
Patented Dec. 20, 1955

2,727,366

SPRINKLER SYSTEM ATTACHMENT FOR A LAWN UMBRELLA

Oscar A. Hagen, Mariposa, Calif.

Application December 31, 1952, Serial No. 328,943

1 Claim. (Cl. 62—139)

This invention relates to air conditioning and cooling devices, and in particular means for keeping cool in hot and humid weather wherein a lawn sprinkler is positioned above a beach or lawn umbrella to provide a screen of water around the umbrella whereby the area below the umbrella remains dry and is comparatively cool.

The purpose of this invention is to provide means for providing a circular screen of water on the lawn of a residence or the like with a comparatively cool dry area within the screen.

Various types of air conditioners and humidifiers have been provided to offset uncomfortable heat in some areas, in the summer, however, the usual conventional device of this type requires a comparatively high installation cost and the operating cost thereof is also comparatively high. With this thought in mind this invention contemplates a method of using water, such as of a sprinkler system for lawns and the like whereby the area below an umbrella or the like is surrounded by a water spray or screen which lowers the temperature in the area.

The object of this invention is, therefore, to provide means for combining a lawn sprinkler system with a lawn umbrella whereby with the sprinkler system operating above the umbrella a vertically disposed water screen is provided around the umbrella and persons positioned in the area below the umbrella and within the screen may enjoy comparatively cool atmosphere.

Another object of the invention is to provide means for providing a comparatively cool area in a hot and humid locality by using a water spray over an umbrella in which the water used for cooling is also used for watering the surrounding area of a lawn or the like.

Another object of the invention is to provide a lawn umbrella having a lawn sprinkler in combination therewith for producing a water screen around the umbrella in which the device is of a simple and economical construction.

With these and other objects and advantages of the invention in view the invention embodies a tubular stem having a valve therein with a water supply connection at the lower end, an enlarged umbrella mounted on the upper end and through which the stem extends and a lawn sprinkler head of the type adapted to be rotated by water pressure therethrough mounted with a swivel joint on the upper end of the stem and positioned above the umbrella.

Other features and advantages of the invention will appear from the following description taken in connection with the drawing, wherein.

Figure 1:
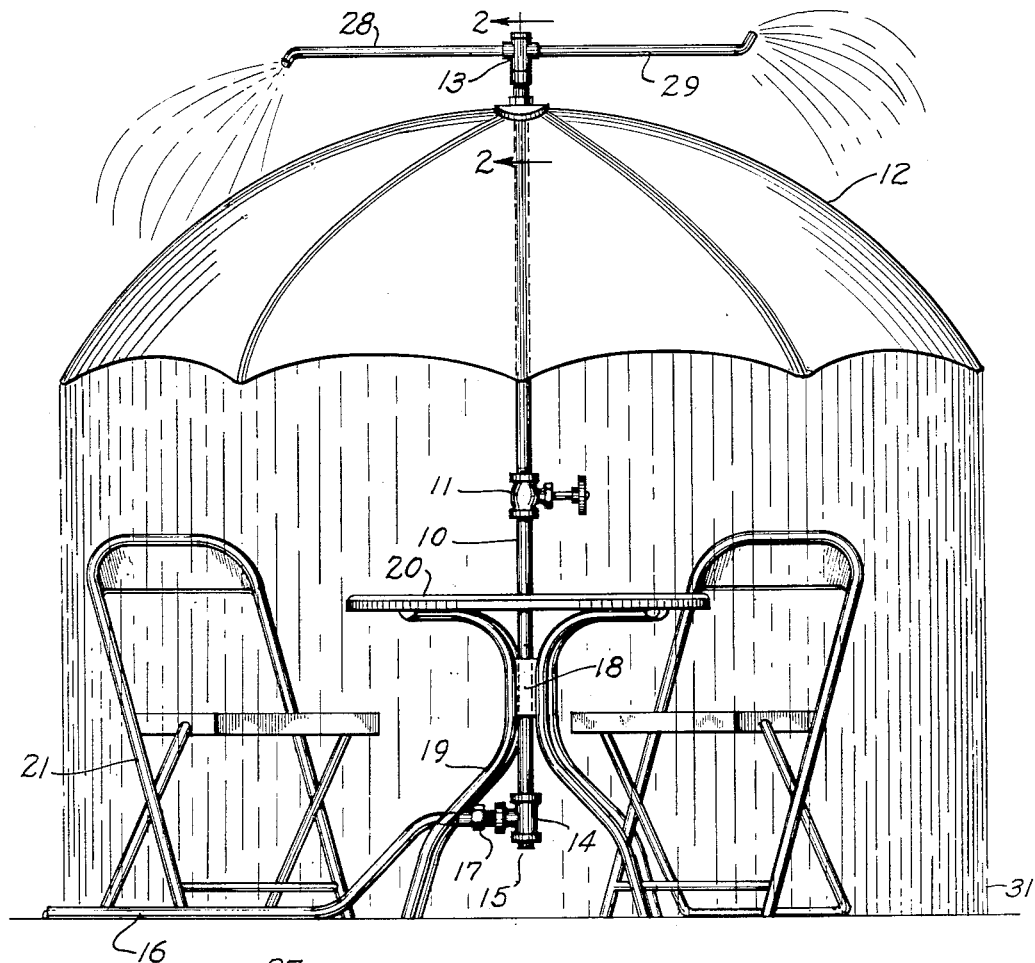
Figure 1 is a side elevational view illustrating the mounting of the lawn sprinkler on an enlarged umbrella and showing a stem of the umbrella extended upwardly through a table around which chairs are positioned.

Referring now to the drawing wherein like reference characters denote corresponding parts the improved cooling device of this invention includes a tubular stem 10 having a valve 11 therein, an enlarged umbrella 12, and a lawn sprinkler head 13.

The lower end of the tube 10 is provided with a supply fitting 14 and the lower end of the fitting to be provided with a drain plug 15. A supply tube or hose 16 is connected with a coupling 17 to the fitting 14 and, with the parts as shown in Fig. 1 the tubular stem 10 is supported in a collar 18 upon which legs 19 of a table 20 are mounted. It will be understood that the table and legs thereof may be of suitable designs.

Chairs, as indicated by the numeral 21 may also be positioned around a table.

Figure 2:
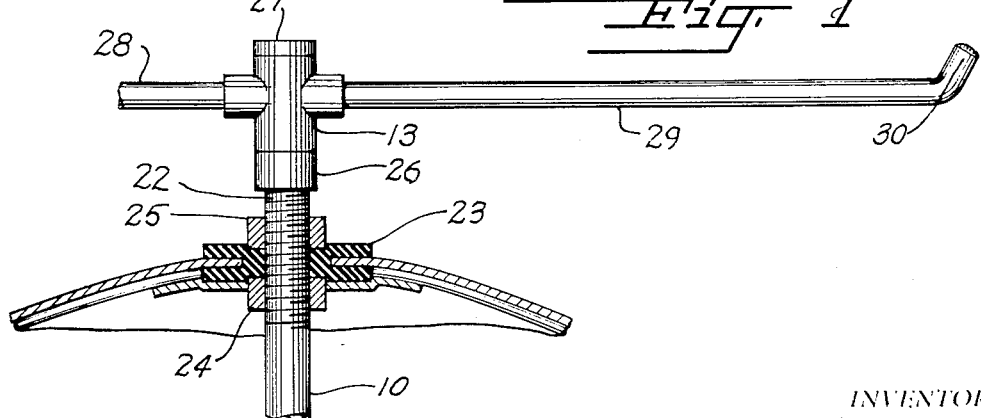
Figure 2 is a vertical section through the upper end of the umbrella stem with parts broken away and with parts shown in section.

The upper end of the stem 10 is threaded, as shown at the point 22, in Fig. 2 and the umbrella 12, which may be provided with an enlarged grommet of rubber or the like, as indicated by the numeral 23, may be secured between nuts 24 and 25 on the threaded section 22.

A collar 26 is threaded on the upper end of the stem 10 and a sprinkler head 13 is journaled on the stem above the collar 26. The head 13 may be held in position with a nut or collar 27.

A swivel connection between the sprinkler head and tube 10 is conventional wherein a sprinkler of the type having extended arms 28 and 29 is journaled on a tube in a stand and with the arms provided with extended ends 30 the sprinkler is rotated as water, under pressure, passes through the arms and is discharged from the angularly disposed ends thereof.

With the parts arranged in this manner the table 20 may be positioned upon a lawn or the like and persons standing around the table or positioned in the chairs 21 may be located in a comparatively cool area with water sprayed from the sprinkler forming a continuous water stream around the periphery of the umbrella, as indicated at the point 31.

It will be understood that the sprinkler head may be of any suitable type or design and also that a shield or hood of any suitable type may be used in place of the umbrella.

It will be understood that other modifications, within the scope of the appended claim, may be made in the design and arrangement of the parts without departing from the spirit of the invention.

What is claimed is:

In a cooling device, the combination which comprises a vertically disposed pipe having a valve therein and having a supply connection at the lower end, a lawn sprinkler head journaled on the upper end of the pipe, and an enlarged umbrella mounted on said pipe and supported by said pipe in spaced relation to the ground, positioned below the sprinkler head, and through which the pipe extends, and a table having supporting legs in which the vertically disposed pipe is positioned, said table supporting the pipe in a vertical position in relation to the ground.

References Cited in the file of this patent

UNITED STATES PATENTS

| | | |
|---|---|---|
| 282,474 | Von Cort | July 31, 1883 |
| 1,020,071 | Askin | Mar. 12, 1912 |
| 2,337,710 | Cowan | Dec. 28, 1943 |
| 2,371,364 | Spillane | Mar. 13, 1945 |
| 2,633,384 | Cockrell | Mar. 31, 1953 |

FOREIGN PATENTS

| | | |
|---|---|---|
| 449,954 | Italy | July 5, 1949 |